UNITED STATES PATENT OFFICE.

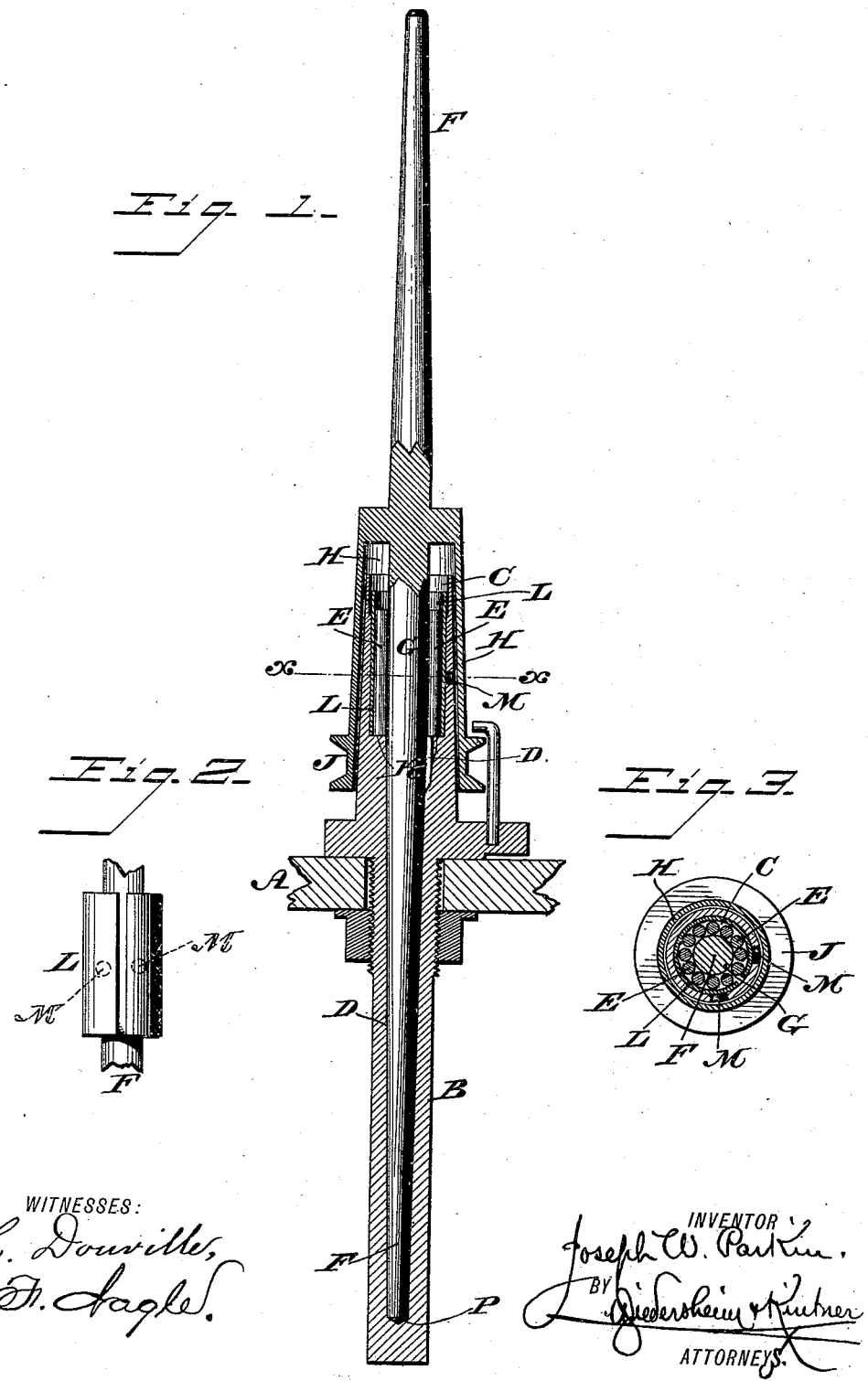

JOSEPH W. PARKIN, OF PHILADELPHIA, PENNSYLVANIA.

SUPPORT FOR SPINNING-SPINDLES.

SPECIFICATION forming part of Letters Patent No. 446,207, dated February 10, 1891.

Application filed May 21, 1888. Serial No. 274,618. (No model.)

*To all whom it may concern:*

Be it known that I, JOSEPH W. PARKIN, a subject of the Queen of Great Britain, residing in the city and county of Philadelphia, State of Pennsylvania, have invented a new and useful Improvement in Supports for Spinning-Spindles, which improvement is fully set forth in the following specification and accompanying drawings.

My invention relates to improvements in bearings or supports for spinning-spindles; and the object of the invention is to provide means for reducing friction on the spindles and keeping them in a proper plane of movement.

The invention consists of a roller-bearing for a spindle mounted in a cup, a split bushing located around the rollers, and a screw working in the wall of the cup and adapted to engage said bushing, whereby provision is made for adjustment when the rollers or spindle, or all of them, become worn or irregular.

Figure 1 represents a partial vertical section of a spindle and a support therefor embodying my invention. Fig. 2 represents a side elevation of a detached portion, showing a portion of the spindle and the adjustable bushing around the same. Fig. 3 represents a horizontal section on line $x\,x$, Fig. 1.

Similar letters of reference indicate corresponding parts in the several figures.

Referring to the drawings, A represents the spindle rail or beam to which the cup B is firmly secured. The cup B is formed at its upper end with the enlarged chamber C, with which communicates the oil-duct D, formed in the inner wall of the cup B below the chamber C, and in said enlarged chamber are placed the anti-friction rollers E.

F represents the spindle, which is stepped in the cup, as at P, so as to revolve therein, and at the part G is cylindrical in shape to permit it to rest against the anti-friction rollers and revolve upon them, thereby materially decreasing the friction in the turning or revolving of the spindle. The spindle F is also provided with the cap H, which carries the whirl J and incloses the upper end of the cup, as clearly shown in Fig. 1.

The operation is as follows: The spindle is placed in the cup, the lower end thereof bearing in the cup and the cylindrical portion thereof being in contact with the anti-friction rollers in the enlarged chamber. The lubricant is placed in the enlarged chamber, and as the spindle is revolved by mechanism well known it is prevented from having an irregular movement by means of the anti-friction rollers, and the oil passes from the rollers to the duct and from it to the lower portion of the cup, where it is prevented from leaking out.

It will be seen that by the construction above set forth more perfect work is insured and the oil is prevented from leaving the enlarged chamber, and thus keeps the spindle lubricated but does not reach the outside of the spindle-support. It is also evident that owing to the rollers the spindle rotates with reduced friction, it being noticed that the rollers rest freely on the base of the chamber C, said base constituting a shoulder K for such purpose.

Interposed between the wall of the chamber C and the rollers E is a split bushing L, and passing through said wall are screws M, which are adapted to bear against the bushing near the ends thereof. By this provision the bushing may be contracted, and provision is thus made for moving the rollers against the spindle, a feature of importance when said rollers and spindle have their surfaces worn away.

Having thus described my invention, what I claim as new, and desire to secure by Letters Patent, is—

A spindle, in combination with cup B, with extended chamber, the anti-friction rollers resting freely on the base of said chamber, the split bushing L between said rollers and the wall of the cup, and a screw M working in the wall of the cup and adapted to bear against the end of the split bushing, substantially as described.

JOSEPH W. PARKIN.

Witnesses:
JOHN A. WIEDERSHEIM,
JNO. K. PLITT.